US 6,567,584 B2

(12) United States Patent
Carlisle et al.

(10) Patent No.: US 6,567,584 B2
(45) Date of Patent: May 20, 2003

(54) ILLUMINATION SYSTEM FOR ONE-DIMENSIONAL SPATIAL LIGHT MODULATORS EMPLOYING MULTIPLE LIGHT SOURCES

(75) Inventors: Clinton Carlisle, Palo Alto, CA (US); Jahja Trisnadi, Cupertino, CA (US)

(73) Assignee: Silicon Light Machines, Sunnyvale, CA (US)

( * ) Notice: Subject to any disclaimer, the term of this patent is extended or adjusted under 35 U.S.C. 154(b) by 98 days.

(21) Appl. No.: 09/782,387

(22) Filed: Feb. 12, 2001

(65) Prior Publication Data
US 2002/0110320 A1 Aug. 15, 2002

(51) Int. Cl.[7] .................................................. F21V 1/00
(52) U.S. Cl. .......................................... 385/33; 362/235
(58) Field of Search .................... 385/31, 33; 362/235, 362/268, 244, 335, 554; 353/100, 101

(56) References Cited

U.S. PATENT DOCUMENTS

| | | | |
|---|---|---|---|
| 4,011,009 A | 3/1977 | Lama et al. .................. 359/571 |
| 5,185,660 A | 2/1993 | Um .............................. 358/60 |
| 5,311,360 A | * 5/1994 | Bloom et al. ................ 359/572 |
| 5,629,801 A | 5/1997 | Staker et al. ................ 359/572 |
| 5,704,700 A | * 1/1998 | Kappel et al. ................. 345/31 |
| 5,808,797 A | 9/1998 | Bloom et al. ................ 359/572 |
| 5,841,579 A | 11/1998 | Bloom et al. ................ 359/572 |
| 5,982,553 A | * 11/1999 | Bloom et al. ................ 359/619 |
| 5,995,303 A | 11/1999 | Honguh et al. ............. 359/708 |
| 5,999,319 A | 12/1999 | Castracane .................. 359/573 |
| 6,071,652 A | 6/2000 | Feldman et al. ............... 430/5 |
| 6,122,299 A | 9/2000 | DeMars et al. ................ 372/20 |
| 6,169,624 B1 | 1/2001 | Godil et al. ................. 359/237 |
| 6,215,579 B1 | 4/2001 | Bloom et al. ................ 359/298 |
| 6,252,697 B1 | 6/2001 | Hawkins et al. ............. 359/290 |
| 6,268,952 B1 | 7/2001 | Godil et al. ................. 359/291 |
| 6,396,789 B1 | 5/2002 | Guerra et al. ................ 369/112 |
| 6,445,502 B1 | 9/2002 | Islam et al. .................. 359/571 |

(List continued on next page.)

FOREIGN PATENT DOCUMENTS

EP 0 322 714 A2 7/1989 ............ G02B/5/30

OTHER PUBLICATIONS

"Micromachined Opto/Electro/Mechanical Systems," Electronic Systems, NASA Tech Briefs, Mar. 1997, pp. 50 & 52.
David M. Burns et al., "Development of Microelectromechanical Variable Blaze Gratings," Sensors and Actuators A 64 (1998), pp. 7–15.
Apte et al., "Deformable Grating Light Valves for High Resolution Displays," Solid State Actuator Workshop, Hilton Head, South Carolina, Jun. 13–16, 1994.

(List continued on next page.)

Primary Examiner—Georgia Epps
Assistant Examiner—Mohammad Abutayeh
(74) Attorney, Agent, or Firm—Haverstock & Owens LLP

(57) ABSTRACT

The present invention is directed to illuminating a one-dimensional spatial light modulator using an illumination system employing multiple light sources. The illumination system comprises a parallel array of light sources which provides a plurality of light outputs to an optical train. The optical train effectively combines the light sources into a single light source. The single light source provides a single light output for uniformly illuminating the spatial light modulator. The optical train includes a first optical train for receiving the light outputs from each light source, magnifying each light output, and overlaying each of the light outputs to form a single real magnified image. A mode conversion lens receives the single real magnified image, converts a mode profile of the single real magnified image into a top hat mode profile, and outputs a diverging light beam with a top hat mode profile. A second optical train shapes the light beam into an appropriate spatial geometry in such a manner that the light beam effectively illuminates the entire spatial light modulator, and directs the light beam onto the spatial light modulator.

22 Claims, 4 Drawing Sheets

U.S. PATENT DOCUMENTS

| | | | |
|---|---|---|---|
| 2002/0015230 A1 | 2/2002 | Pilossof et al. | 359/558 |
| 2002/0021485 A1 | 2/2002 | Pilossof | 359/295 |
| 2002/0079432 A1 | 6/2002 | Lee et al. | 250/216 |
| 2002/0105725 A1 | 8/2002 | Sweatt et al. | 359/566 |

OTHER PUBLICATIONS

Sene et al., "Polysilicon micromechanical gratings for optical modulation," Sensors and Actuators, vol. A57, pp. 145–151, 1996.

Amm et al., "*Invited Paper*: Gratings Light Valve™ Technology: Update and Novel Applications," SID Digest, vol. 29, 1998.

R. W. Corrigan et al. "Calibration of a Scanned Linear Grating Light Value Projection System," Silicon LIght Machines, Sunnyvale, CA, May 18, 1999.

R. W. Corrigan, et al. "Calibration of a Scanned Linear Grating Light–Value Projection System for E–Cinema Applications," May 1999, SID'99, San Jose, CA, May 19, 1999.

* cited by examiner

ILLUMINATION SYSTEM FOR ONE-DIMENSIONAL SPATIAL LIGHT MODULATORS EMPLOYING MULTIPLE LIGHT SOURCES

FIELD OF THE INVENTION

The present invention relates in general to illumination optics. It relates in particular to an illumination system wherein light is provided incident on a spatial light modulator.

BACKGROUND OF THE INVENTION

A critical enabling technology for display systems in general, and most particularly laser based displays, is a spatial light modulator, or SLM. A spatial light modulator modulates intensity levels of light to impart information which is intended to be displayed on a display monitor. The information being content, which are light or dark levels for each pixel on the display.

One-dimensional spatial light modulators can be used for applications in high-resolution display systems. To impart a two-dimensional information field, systems using a one-dimensional spatial light modulator typically scan a column or row of light (depending on the scan direction) over the appropriate dimensions of the display field. Scanning can be accomplished by using a simple mirror mounted on a galvanometer. Many other conventional methods can also be used.

A general design consideration for any spatial light modulator based display is getting as much illumination onto the spatial light modulator as to provide the necessary illumination onto the display. As such, optimally directing light from multiple light sources onto the spatial light modulator is desirable. To maximize the illumination efficiency of the incident light on the spatial light modulator, constraints on the shape of the light beams and the angle to which the light beams illuminate the spatial light modulator need to be taken into account. Shaping and directing light beams under such tight constraints presents numerous challenges to the illumination optics.

A particularly effective device for use as a spatial light modulator is a reflective grating light valve type device array. Such displays are commonly known in the art. This type of reflective grating light valve type device array is capable of providing displays of very high resolution, very high switching speeds, and high bandwidth by virtue of the very small size (about 4×200 micrometers) of operable elements of the array. The very small operable elements can be operated electrostatically with low applied voltage. In combination with laser illumination and appropriate optics, a high resolution display can be achieved.

A significant problem in designing such a display system arises from the fact that the grating light valve type device array modulates light by diffraction, and light incident on the array for modulation is returned as a combination of reflected and diffracted light beams. Because of this, an optical system used with the display must be capable, not only of magnifying, focusing, or projecting an image of the grating light valve type device array to form a displayed image, but must also be capable of separating the diffracted light from the reflected light.

Separating light in such a manner puts an extremely tight constraint on the angular extent that the incident light beams on the grating light valve type device can have. The constraints on light beam shape and angle are even tighter for grating light valve type devices than those constraints imposed upon other SLM based display systems.

Also, conventional illumination of a spatial light modulator requires the use of multiple light sources. In the case of laser based displays, each light beam illuminates a small portion of the spatial light modulator which in turn illuminates a small portion on the display. Problems arise due to conventional implementation problems of keeping all the power disbursement of each light beam in balance. Problems also arise when a light source becomes inoperative. An inoperative light source will no longer illuminate its small portion of the spatial light modulator and consequently, a small portion on the display will not be illuminated. Typically, this is manifested as a small dark spot on the display. Such an occurrence is obviously highly undesirable.

What is needed is a means for multiple light sources to uniformly illuminate a spatial light modulator such that failing light sources do not result in missing images on the display. What is further needed is to provide such a uniform illumination within the tight optical constraints necessary to maximize the illumination efficiency of the multiple light sources.

SUMMARY OF THE INVENTION

The present invention is directed to illuminating a one-dimensional spatial light modulator using an illumination system employing multiple light sources. The illumination system comprises a parallel array of light sources which provides a plurality of light outputs to an optical train. The optical train effectively combines the light sources into a single light source. The single light source provides a single light output for uniformly illuminating the spatial light modulator.

The optical train includes a first optical train for receiving the light outputs from each light source, magnifying each light output, and overlaying each of the light outputs to form a single real magnified image. A mode conversion lens receives the single real magnified image, converts a mode profile of the single real magnified image into a top hat mode profile, and outputs a diverging light beam with a top hat mode profile. A second optical train shapes the light beam into an appropriate spatial geometry in such a manner that the light beam effectively illuminates the entire spatial light modulator, and directs the light beam onto the spatial light modulator.

DETAILED DESCRIPTION OF THE PREFERRED EMBODIMENT

An illumination system of the present invention utilizes multiple light sources to illuminate a one-dimensional spatial light modulator, or SLM. The illumination optics perform two principle functions. One, configure the light beams into an appropriate spatial geometry in such a manner that each light beam overlaps and illuminates the entire SLM. This manner of combining light beams and directing them onto the SLM in an optimum manner can be referred to as "stacking." In conventional display systems, inoperative light sources result in dark spots on the display. However, by designing the illumination optics such that each light beam effectively illuminates the entire SLM, the display can function with one or many light sources inoperative, as only the illumination intensity is affected by the number of light sources used for illumination. Second, convert the mode profile of each light beam into the optimum shape for efficient illumination of the SLM within the optical constraints of the complete system. The conversion of the light beam profiles into the proper mode for illumination of the SLM is termed "profile conversion."

Characteristics of the SLM place definite design constraints on the illumination system. The objective of the present invention is to direct light from multiple light sources onto a one-dimensional SLM, the characteristics of which place fixed limitations on which angle the SLM can receive light from (the angular subtense) and over what exact dimensions the SLM can receive light (the acceptance area). In the preferred embodiment, the SLM is a grating light valve array type device. The grating light valve type device requires even stricter design constraints than other conventional SLM's.

Turning now to the drawings, it should be noted that like components are designated by like numerals throughout the figures.

Figure 1:
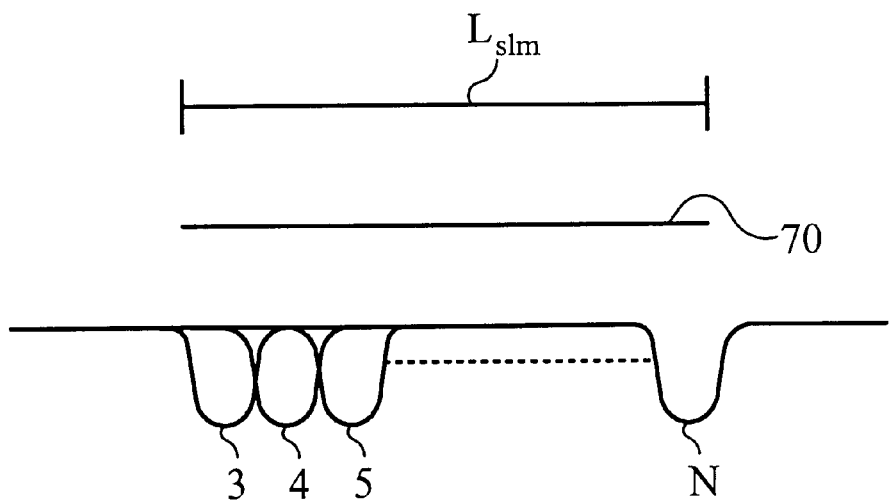
FIG. 1 illustrates a conventional illumination wavefront originating from an array of single-mode fiber light sources.

FIG. 1 illustrates a conventional illumination wavefront originating from an array of single mode fiber light sources, the configuration of the array will be described in more detail below. Each laser light source produces a laser beam output. In the case of single-mode fiber, the laser beam has a Gaussian mode profile. Individual Gaussian mode profiles are represented in FIG. 1 as Gaussian mode profile 3, 4, 5 . . . N. An array of single-mode fiber light sources will produce an array of Gaussian mode profiles. If an illumination system is designed to illuminate a spatial light modulator 70 of length $L_{slm}$, a sufficient number of light sources, N, will be used to generate an array of Gaussian mode profiles N sufficient to illuminate the entire spatial light modulator 70. As discussed above, and as can be seen in FIG. 1, if one or more light sources were to become inoperative, the corresponding one or more light beams with corresponding Gaussian mode profiles will no longer illuminate their corresponding portion of the spatial light modulator 70. Such a lack of illumination leads to a corresponding lack of illumination of the display, typically in the form of dark spots. Additionally, due to the mismatched geometries of the Gaussian mode profile waveform and the physical dimensions of the spatial light modulator 70, there is a resultant waste, or loss of illumination.

Figure 2:
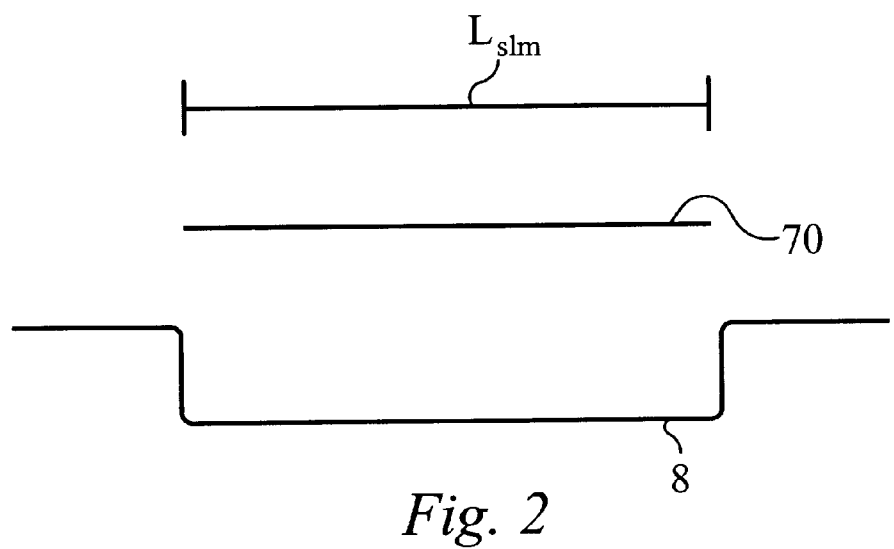
FIG. 2 illustrates the optimum top-hat mode profile illumination wavefront.

FIG. 2 illustrates the optimum shape that each light beam be converted to such that each beam efficiently illuminates the entire spatial light modulator 70. Each light beam is magnified and converted into essentially the same profile, a top-hat mode profile 8. The top-hat mode profile 8 has a uniform amount of power along its entire length, $L_{slm}$. As compared to the localized illumination of the light sources with Gaussian mode profiles as previously illustrated in FIG. 1, the present invention provides a global illumination by all the light sources. Global, in this case, referring to the length of the spatial light modulator 70 with an effective area of length $L_{slm}$. In the conventional configuration of FIG. 1, if a light sources becomes inoperative, the result is a dark spot on the display. However, in the present invention, if a light source becomes inoperative, there is not a resulting dark spot on the display. Instead, due to the global illumination of all light sources, if one light source becomes inoperative, the illumination on the entire spatial light modulator 70 will be reduced in intensity by whatever fraction that the one source represents over the total illumination.

Figure 3:
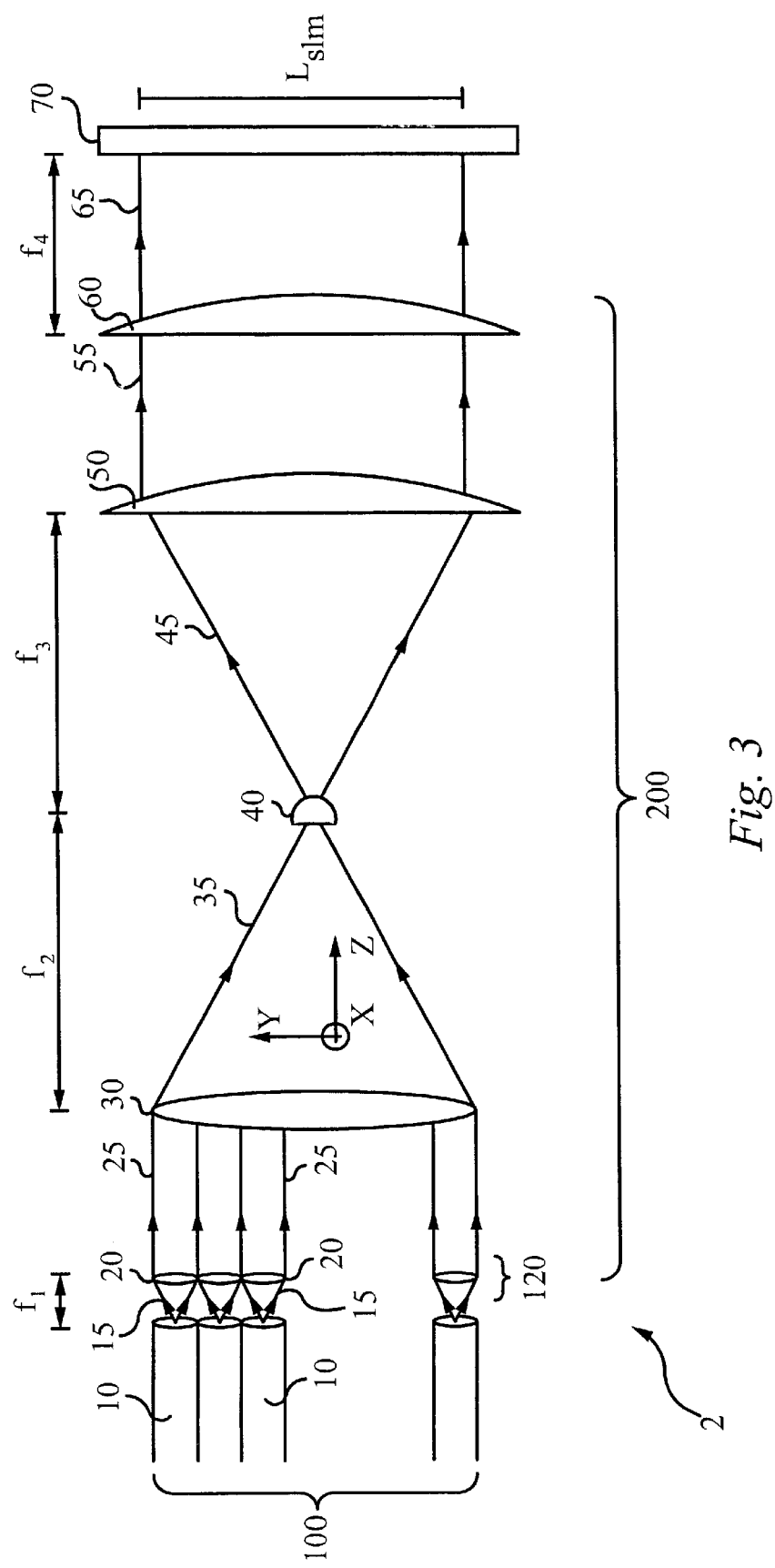
FIG. 3 illustrates a diagram of the preferred embodiment of the illumination system of the present invention.

FIG. 3 illustrates one preferred embodiment of an illumination system for illuminating a one-dimensional spatial light modulator employing multiple light sources of the present invention. An illumination system 2 includes an array of light sources 100 optically coupled to an optical train 200. The array of light sources includes a plurality of individual light sources 10. The light source 10 can be of any general kind; in the preferred embodiment, light source 10 is a single-mode fiber. A divergent light output 15 from each of the light sources 10 pass through the optical train 200, wherein the light outputs 15 are magnified, overlaid and shaped into effectively a single light source which is directed onto the spatial light modulator 70. The optical train 200 includes a microlens array 120, a magnifying/overlaying lens 30, a mode conversion lens 40, a collimating lens 50 and a focusing lens 60. The microlens array 120 includes a plurality of individual microlenses 20, where there is one microlens 20 for each light source 10.

Microlens 20 is illustrated, for simplicity as a simple "spherical" lens, i.e. having equal refractive power in the x and y axes. In FIG. 3, the y axis is in the plane of the illustration and the x axis is perpendicular to the plane of the illustration. The purpose of the lens is to collimate light from the light source in both axes. It should be evident to those skilled in the art that alternative lenses and lens configurations can be used to provide the desired collimating effect.

The light output 15 passes through the microlens 20 and is collimated in both the x and y axes. Bi-axially collimated light 25 is effectively parallel to an optical axis of the illumination system 2, the optical axis being in the z direction. All light outputs 15 from the light source array 100 are refracted by the microlens array 120 in this manner. The position of the microlens array 120 is designed to make optimum use of the etendue of each light source 10. The etendue is a function of brightness and power of the light source and will be discussed in detail below. All light sources 10 are stacked together so that spatially there is no dead space in between each adjacent light source. A diverging cone of light is generated from each light source 10. The microlens array 120 is configured at a distance where the outer boundary of each adjacent cone of light just intersects, it is at this intersection point where there is no overlap or empty space between adjacent cones of light. This distance is also equal to the focal length of the microlens 20, which is designated as $f_1$ in FIG. 3. In this manner, the light source array 100 and the microlens array 120 are aligned optimally. All light outputs 15 from the light source array 100 are collimated by the microlens array 120 so that as the light outputs 15 pass through the microlens array 120, the pupil of all collimated light 25 is essentially at infinity. As a result, the collimated light 25 is directed parallel to the optical axis.

The collimated light 25 from the microlens array 120 passes through the magnifying/overlay lens 30. It should be noted here that lens 30 can be formed from one or more spherical, aspherical, toroidal, or cylindrical (spherical and aspherical) lens elements, and is shown as a single element for simplicity, although usually, a single lens element will suffice. Refracted light 35 from the lens 30 forms a real image by overlaying all collimated light 25 into one real image. This essentially forms a single light source, with certain angular and spatial constraints associated with it, located at the position of the real image produced by the lens 30. The light outputs 15 from the light array 100 are effectively combined into a quasi-single light source. Additionally, the lens 30 provides a magnification factor so that the size of the light coming out of the light source 10 is magnified by the magnification factor. Therefore, the single light source produced at the real image is a magnified version of the light output 15 from the light source 10. The magnification factor is determined by the ratio of the focal lengths of the lens 30 and the microlens 20. The single light source has the same spatial property as that of the light output 15, which has some arbitrary spatial mode profile. In the preferred case where the light source 10 is a single-mode fiber, this is a gaussian mode profile.

The mode conversion lens 40 is positioned at the focal point of the lens 30, where the real image is formed by the lens 30. In FIG. 3, the focal length of lens 30 is designated $f_2$. The refracted light 35 passes through the mode conversion lens 40. The mode profile of the refracted light 35 is converted by the mode conversion lens 40 into a top-hat mode profile. There are several conventional methods for performing the profile conversion. The preferred method is to use an aspheric cylinder lens, although it should be obvious to those skilled in the art that other conventional methods can by used within the present invention. The aspheric cylinder lens is especially desirable for laser light sources in one-dimension. The aspheric cylinder lens 40 has refractive power in only one-dimension, here the y-axis. The resulting divergent light 45 has a top-hat mode profile in the y-axis, while maintaining the gaussian mode profile in the x-axis. The divergent light 45 passes through the collimating lens 50 and is collimated in both the y and x axes. The collimating lens 50 is placed its focal length in distance from the mode conversion lens 40. The focal length of collimating lens 50 is designated $f_3$. Bi-axially collimated light 55 is then passed through the focusing lens 60. The focusing lens 60 focuses the collimated light 55 in the x-axis. In this manner, a focused light 65 is directed to the spatial light modulator 70. At a focal length of the focusing lens 60, designated $f_4$, the focused light 65 converges to a point in the x-axis while remaining unchanged in the y-axis. At the focal plane of the focusing lens 60, the focused light 65 is focused into a tight line in the y-axis while remaining basically unchanged in the orthogonal x-axis. The spatial light modulator 70 is located at the focal plane of the focusing lens 60 thereby receiving a uniform incident light, with a top-hat mode profile. The length of the uniform incident light is essentially $L_{slm}$, the details of which will be described in detail below.

While designing the illumination system 2 it is critical to account for optical physics conservation principles. When a light is emitted from a source, it has a particular solid angle, and the light intersects a receiving surface over a particular cross-sectional area. The product of the solid angle and the cross-sectional area is referred to as the etendue. Any light source has a property termed brightness which describes the total power per unit area per solid angle which the source emits, or Brightness=Power/Etendue. Very fundamental arguments can be put forth to establish that the brightness of any source can never be increased by any purely passive optical train (e.g. mirrors and lenses).

The product of the length of the SLM in a given direction and the permissible angular subtense of the illuminating beam onto the SLM determine how many sources can be effectively used to illuminate the SLM. In regards to FIG. 3, the angular subtense can also be considered the input angle measured in the x-axis through which the focused light 65 converges onto the SLM. Since the acceptance area and solid angle of the SLM are dictated by system-level constraints, the brightness of the source or sources used to illuminate the SLM are immediately determined by the total power required for the application and the etendue of the optical train and SLM. The etendue of the SLM is an inherent, fixed value which presides as the fundamental limitation of the entire illumination system. It is this fixed etendue limit of the SLM which ultimately determines the number of light sources which can be used. Within this etendue "budget" it is often possible to use many high-brightness sources to illuminate the SLM. Lasers are well known examples of light sources which posses very high inherent brightness. The illumination system combines multiple light beams optically in a way that creates as uniform an illumination field along the SLM within the etendue conservation constraints discussed above.

Even if a set of numerous light sources, such as a set of lasers, has a total brightness that is within the budget of the SLM, it is often far from straightforward to design a practical illumination optical train that directs all the sources to the SLM. One method of closely stacking a set of light beams so that they can be combined and have profile conversion performed efficiently is via a set of single-mode optical fibers placed in a precision V-block array. FIG. 3 illustrates this deployment scenario. To illuminate a one-dimensional SLM, the long dimension of the V-block array is oriented parallel to the long dimension of the one-dimensional SLM. The total number of single-mode fibers that can be accommodated in a given display system employing a one-dimensional SLM is determined by the etendue of the SLM.

Efficient mode profile of multiple light beams is critical to the performance of any one-dimensional SLM-based display system. Although the aspheric cylinder lens is used in the preferred embodiment, there are several approaches to profile conversion which can also be utilized within the present invention. Some approaches employ optical elements that introduce large optical path differences between different parts of an input beam's spatial mode via diffraction, multiple reflections in an integrating bar, fly's-eye or other microlens-array approaches, or random diffusers. However, interference effects are generally quite pronounced when these techniques are implemented on laser beams with coherence lengths in excess of a few millimeters. For the mode conversion of a Gaussian spatial mode profile to a top-hat mode profile suitable for efficient overlap onto a fixed-length SLM, the technique of using overcorrected spherical aberration has been demonstrated in various forms. To perform this form of mode conversion, an aspheric cylinder lens can be used, as illustrated in FIG. 3 as aspheric cylinder lens 40. The aspheric cylinder lens approach requires only one optical element and is thus highly efficient and applicable to a broad range of wavelengths. The principal disadvantage to all techniques that employ overcorrected spherical aberration as the means of profile conversion is that it demands a precise shape, size, and alignment of the input light beam (refracted light 35 in FIG. 3). The mode conversion efficiency degrades very rapidly with misalignment or input mode distortion.

However, the use of a set of single-mode fibers arranged in a precision V-block assembly fitted with a collimating microlens array with the fiber outputs all magnified and imaged onto the aspheric cylinder lens surface (as shown in FIG. 3) provides desirable results. Such an arrangement yields excellent input mode quality (due to the use of single-mode fibers), good opto-mechanical stability (due to the short focal lengths required of the imaging lens used in conjunction with microlenses for collimating the light beams), and efficient use of light from numerous sources via the individual fibers in the array.

As previously discussed, a top-hat mode profile is desirable, or even essential, of the incident light to the SLM. The top-hat mode profile makes maximum use of the light generated by each light source, due in large part to the top-hat mode profile matching the physical parameters of the SLM. In the case of other mode profiles, for example the Gaussian mode profile of the single light source prior to mode conversion, a large percentage of the light is wasted because the mode profile is not properly matched to the SLM. The efficiency of the illumination optics can then be regarded as how effectively the illumination sources can be transported to the SLM while being transformed into a top-hat profile whose dimensions match those of the SLM. For the illumination system of the present invention, the total number of sources which can be accommodated is established using the configuration illustrated in FIGS. 3–5 along with the computations which will be discussed in detail below.

Figure 4:
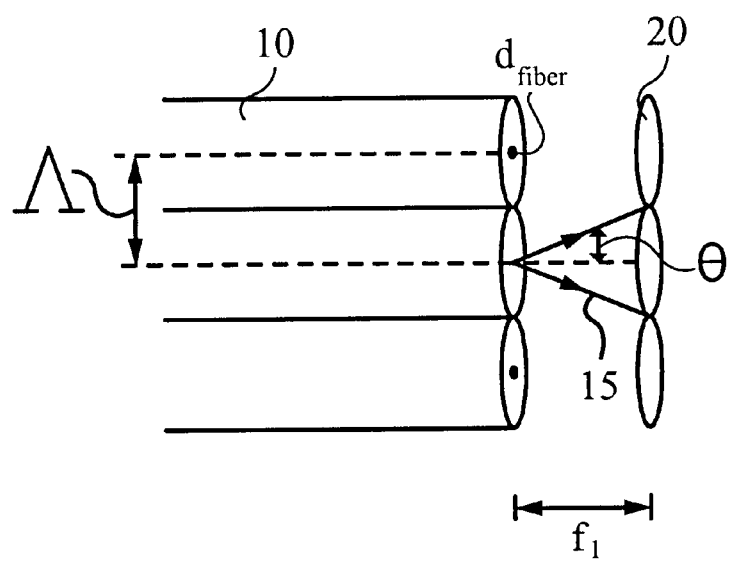
FIG. 4 illustrates the preferred configuration of the light source array and micro-lens array according to the preferred embodiment of the present invention.
Figure 5:
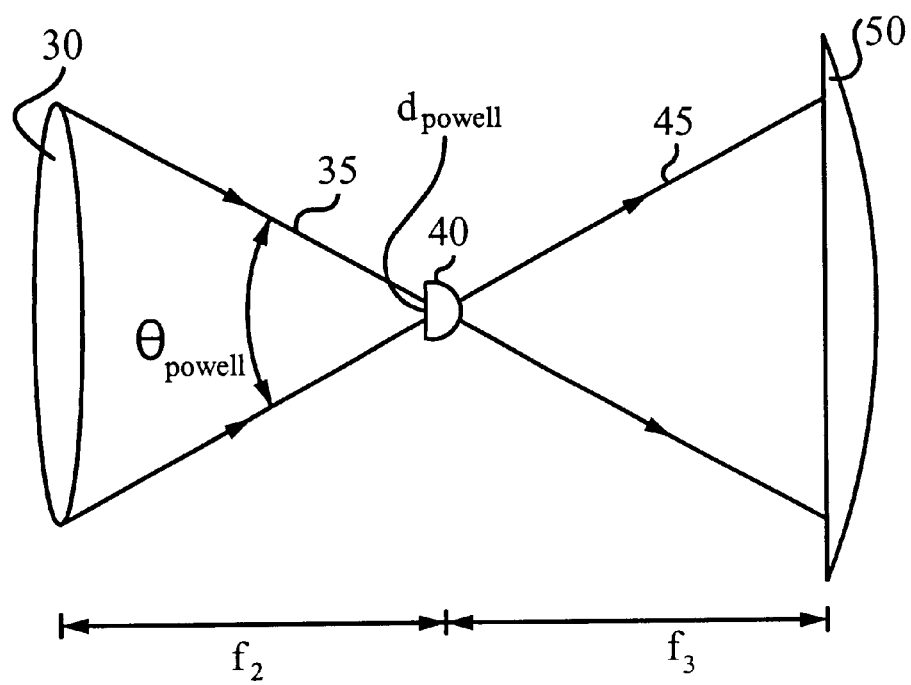
FIG. 5 illustrates the preferred configuration of the light beams entering and leaving the mode conversion lens according to the preferred embodiment of the present invention.

The array of single-mode fiber sources 100 are arranged in a precision V-block with center-to-center spacing of adjacent fibers equal to $\Lambda$, illustrated in FIG. 4. Again referring to schematic of an illumination scheme as shown in FIG. 3, the focal length $f_1$ of the individual microlenses 20 in the microlens array 120 is uniquely determined from the relation $$f_1 = \Lambda/2NA_{fiber} \tag{1A}$$

where $NA_{fiber}$ is the numerical aperture of the fiber. More specifically, $NA_{fiber} = \sin\theta$ where $\theta$ is the half angle accepted by the fiber, illustrated in FIG. 4. Most single-mode fibers have an $NA_{fiber}$ equal to 0.11 or 0.12. This corresponds to an angle accepted by the fiber approximately equal to 14 degrees. Equation (1A) can also be represented as $$f1 = \Lambda(f/\#)_{fiber} \tag{1B}$$

where $(f/\#)_{fiber}$ is the f-number of the fiber. The focal length $f_2$ of the magnification/overlay lens 30 is then simply $$f_2 = Mf_1 = d_{powell} f_1/d_{fiber} \tag{2}$$

where $d_{powell}$ is the $1/e^2$ diameter required for the Gaussian beam input onto the aspheric cylinder lens 40 (often referred to as a Powell lens) for efficient conversion into a top-hat mode profile, and $d_{fiber}$ is the mode field diameter of the output from the single-mode fiber source 10, and M is the optical magnification produced by the lenses of focal lengths $f_1$ and $f_2$. Although the expression in equation (2) above derives from geometrical-optics formalism, it remains valid when relating diffraction-limited spot sizes at different conjugates along an optical train. This point is critical when determining where each lens in the optical train specifically needs to be placed. Within the optical train 200, the plurality of light outputs 15 have been magnified and overlaid to form a single light source at the real image of the lens 30. Essentially, all the light sources have been combined optically into a single optical element. To convert the mode profile of the optical element into the necessary top-hat mode profile, a very specific dimension on the light beam entering the mode conversion lens 40 is required. The specific dimension is the $d_{powell}$ described above. Thus, the proper magnification value, M, as applied in determining the dimension of the real image, $d_{powell}$, is critical. If the size of the real image is not optimal, the top-hat mode profile will be adversely effected. Where the real image is optimal, the top-hat mode profile resembles the half-rectangular shape illustrated in FIG. 2 as the top-hat mode profile 8. If the real image is too small, the top-hat mode profile becomes rounded. If the real image is too large, the top-hat mode profile develops spikes at the edges. In neither the too small nor too large case are the resultant mode profiles desirable.

From (1A) and (2) above it follows that $$f_2 = (\Lambda d_{powell})/(2NA_{fiber} d_{fiber}) \tag{3}$$

The full angle subtended by the refracted light beams 35 which are incident on the mode conversion lens 40 is seen to be $$\theta_{powell} = ((N-1)\Lambda)/f_2 \tag{4}$$

where N is the number of fiber sources 10 in the array 100. Equating the angular extent of divergent light beams 45 which are incident on the collimating lens 50 leads to $$f_3 = (L_{slm}(f/\#)_{powell})/(1 - 2(N-1)d_{fiber}NA_{fiber}(f/\#)_{powell}d_{powell}) \tag{5A}$$

where $(f/\#)_{powell}$ represents the focal length of the mode conversion lens divided by its clear aperture. $(f/\#)_{powell}$ is also referred to as the f-number of the conversion lens. The focal length $f_3$ can alternatively be expressed as $$f_3 = (L_{slm}(f/\#)_{powell})/(1 - (f/\#)_{powell} \theta_{powell}) \tag{5B}$$

In order to produce a sufficient pixel resolution in the scan direction (horizontal in the preferred embodiment), the line illumination on the grating light valve type device must be sufficiently narrow and not to exceed the pixel size. Such a requirement dictates the choice for the focal length $f_4$ of cylindrical lens 60. If the light source is diffraction limited, then the maximum focal length is:

$$f_4 = (pi/4)*(\text{Pix})*(\text{Beam Width})/(\text{Wavelength})$$

where Pix is the pixel size, and Beam Width and Wavelength reference to the light source. If for example, Pix=25 um, Beam Width=2.5 mm, and Wavelength=0.532 um (green), then the maximum $f_4$=92 mm. In practice, a shorter $f_4$ is preferred to produce a better horizontal resolution, typically in the range $f_4$=60 to 75 mm.

Thus, the focal lengths of all the lenses in the illumination optical train are determined by the inherent properties of the single-mode fibers, the dimensions of the SLM, and the optical properties of the mode conversion lens.

Figure 6:
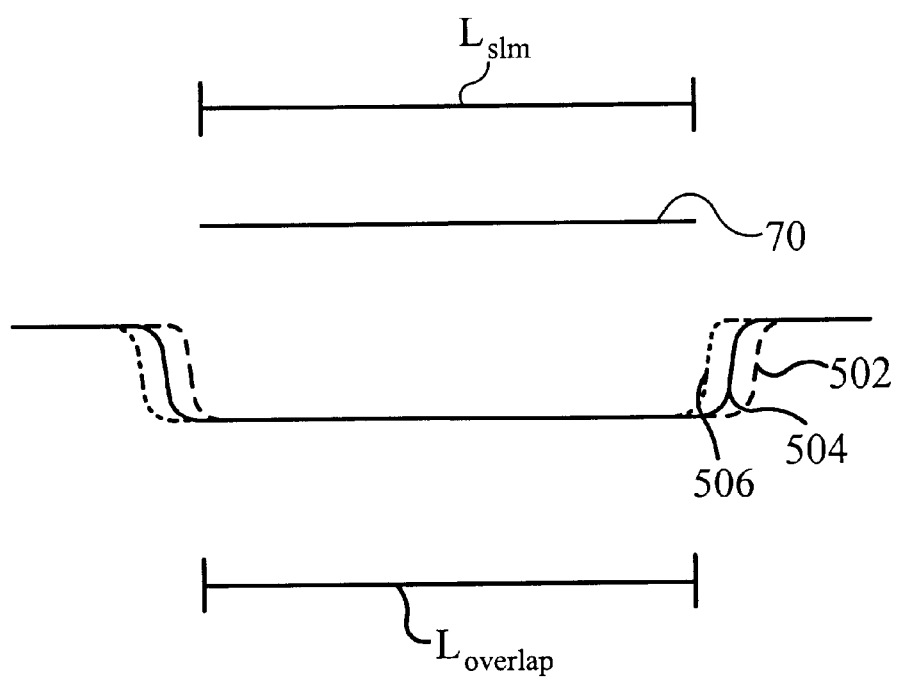
FIG. 6 illustrates an example of three displaced top-hat mode profiles.

Due to the slight angle variance of the light sources 10, there will be a slight displacement of the various top-hat mode profiles as they illuminate the spatial light modulator 70. The magnification of the real image acts to minimize this displacement. The top-hat mode profile 8 in FIG. 2 illustrates the optimal case where the top-hat profiles from each light source 10 exactly overlap. In practice, each top-hat mode profile is slightly displaced when overlapped. The top-hat profiles can not perfectly overlap because that would violate optical conservation principles. FIG. 6 illustrates an example of three displaced top-hat mode profiles 502, 504, 506 to demonstrate this point. The common overlap area of the top-hat mode profiles 502, 504, 506 is represented as $L_{overlap}$. $L_{overlap}$ is the effective length of the incident light hitting the SLM. The portion of the top-hat mode profiles which fall on either side of $L_{overlap}$ are effectively "trimmed"

and not used to illuminate the SLM. The trimmed light simply falls outside the boundaries of the SLM. The displacement of the three top-hat mode profiles 520, 504, 506 has been exaggerated for illustrative purposes. In the case of the present invention, the displacement is quite small. In a properly configured illumination system, the length of overlap, $L_{overlap}$, should be the same as the length of the SLM, $L_{slm}$. The efficiency of the illumination is measured by how much of the total light falls within the SLM. In designing the illumination system of the present invention, trimming is anticipated and each individual laser illuminates an area slightly larger than the SLM.

Returning to FIGS. 3–5, the net efficiency of the illumination is $$n = L_{slm}/(L_{slm} + f_3 \theta_{powell}) \tag{6}$$

where $f_3 \theta_{powell}$ represents the light that has been trimmed due to the displacement of the overlaid top-hat mode profiles. After some algebra, this result can be re-expressed as $$n = 1 - \tfrac{1}{2}(N-1)(d_{fiber} NA_{fiber})/(d_{powell} NA_{powell}) \tag{7}$$

or $$n = 1 - \tfrac{1}{2}(N-1) E_{fiber}/E_{powell} \tag{8}$$

where $E_{fiber}$ represents the etendue of each of the fiber sources along the long dimension of the one-dimensional SLM, and $E_{powell}$ represents the same property for the mode conversion lens 40. From (7) it is evident that fiber sources with the lowest etendue are the most efficient, while the fastest convergent lens of the largest practical dimensions is the most efficient. In practice, the system may impose further restrictions on the etendue along the one-dimensional SLM. If these restrictions are collectively denoted by $\theta_{system}$, then $$\theta_{powell} = \min[(N-1)\Lambda/f_2, \theta_{system}]. \tag{9}$$

This situation occurs, for example, in a projection system that employs the diffraction based grating light valve type device for the one-dimensional SLM. In this case, $\theta_{system}$ must be smaller than the first order diffraction angle of the light reflected off the grating light valve type device.

The etendue of the illumination along the grating light valve type device must not exceed the product:

(light valve length)*(angular spread)=(27.5 mm)*(1 degree)

This requirement is to ensure sufficient discrimination of the grating light valve type device first order diffractions in red, green, and blue from their $0^{th}$ and $2^{nd}$ orders. In short, Schlieren-ability.

As a specific numerical example of the application involving a grating light valve type device, take the case of $(f/\#)_{powell}=2$, $d_{fiber}=3.8$ um (single-mode fiber for green light), $d_{powell}=1000$ um, and $NA_{fiber}=0.11$. If an efficiency n=0.9 is required (90% of the total light falls within the grating light valve type device), then the calculations result in N=120.6. So, in this example, up to 120 single-mode fiber sources can be employed with 90% overlap efficiency onto a grating light valve type device, using the above described optical components. Additionally, note that the focal length values of all the optics in the illumination train, $f_1$, $f_2$, $f_3$, and $f_4$ are completely determined once the NA and mode field diameter of the output of the single-mode fiber, the pitch A of the V-block array, the length $L_{slm}$ of the SLM, and the profile conversion lens are all specified.

In an illumination system in accordance with the preferred embodiment of the present invention, an array of single-mode fibers output an array of light beams. Each light beam is collimated by a corresponding microlens, cumulatively referred to as a microlens array. The collimated light from the microlens array passes through a magnification/overlay lens whereby each light beam is magnified and overlaid to form a real image at the focal point of the magnification/overlay lens. This effectively produces a single light source at the real image, the single light source having the same Gaussian mode profile as the individual light beams output from the single-mode fibers. Light from the real image passes through an aspheric cylinder lens whereby the Gaussian mode profile is converted to a top-hat mode profile and the light is divergently output. The divergent light is collimated as it passes through a cylindrical collimating lens and the collimated light is focused into a uniformly illuminated line of light as it passes through a cylindrical focusing lens. The uniformly illuminated light comprises a top-hat mode profile with a length effectively equal to the length of a spatial light modulator, on which the uniform light is incident. Within this illumination system, the illumination of each single-mode fiber is optimally combined and converted to provide a single-source uniform illumination to the spatial light modulator.

It will be readily apparent to one skilled in the art that other various modifications may be made to the preferred embodiment without departing from the spirit and scope of the invention as defined by the appended claims. For example, the collimating lenses are described as single lenses; however, the same collimating effect can be obtained through multiple lenses. Similarly, the mode conversion lens and the focusing lens can be embodied within a multiple lens configuration.

We claim:

1. An illumination system for illuminating a spatial light modulator, comprising:

a. a plurality of light sources for providing a plurality of light outputs; and b. an optical train coupled to receive the light output from each of the light sources, wherein the optical train effectively overlays each of the light sources to form a single real magnified image, converts the single image into a single light beam with a top hat mode profile, and directs the single light beam to uniformly illuminate the spatial light modulator.

2. The illumination system according to claim 1 wherein the spatial light modulator is a one-dimensional spatial light modulator.

3. The illumination system according to claim 1 wherein the spatial light modulator is a one-dimensional grating light valve type device array.

4. The illumination system according to claim 1 wherein the optical train comprises:

a. a first optical train coupled to the plurality of light sources for receiving the light outputs from each light source, magnifying each light output, and overlaying each of the light outputs to form a single real magnified image;

b. a mode conversion lens coupled to the first optical train for receiving the single real magnified image, converting a mode profile of the single real magnified image into a top hat mode profile, and outputting a diverging light beam with a top hat mode profile; and c. a second optical train coupled to the mode conversion lens for shaping the light beam into an appropriate spatial geometry in such a manner that the light beam effectively illuminates the entire spatial light modulator, and directing the light beam onto the spatial light modulator.

5. The illumination system according to claim 4 wherein the set of light sources is an array of single mode fibers, each single mode fiber providing a laser beam with a gaussian mode profile.

6. The illumination system according to claim 5 wherein the mode profile of the single real magnified image is also the gaussian mode profile.

7. The illumination system according to claim 4 wherein the mode conversion lens is an aspheric cylinder lens.

8. The illumination system according to claim 4 wherein the first optical train comprises a micro-lens array, one micro-lens for each light source, for collimating the light source outputs, and a first lens coupled to the micro-lens array for magnifying and overlaying each of the collimated light source outputs received from the micro-lens array to form the real magnified image.

9. The illumination system according to claim 8 wherein the magnification of the real magnified image is determined by the focal lengths of the micro-lens and the first lens.

10. The illumination system according to claim 8 wherein the first lens is a plurality of lenses.

11. The illumination system according to claim 4 wherein the second optical train comprises a collimating lens for collimating the diverging light beam, and a focusing lens for shaping the light beam into the appropriate spatial geometry and directing the light beam to the spatial light modulator.

12. The illumination system according to claim 4 wherein the mode conversion lens is a plurality of lenses.

13. An illumination system for illuminating a one-dimensional spatial light modulator, comprising:
   a. a plurality of light sources for providing a plurality of light outputs;
   b. a first optical train coupled to the plurality of light sources for receiving the light outputs from each light source, magnifying each light output, and overlaying each of the light outputs to form a single real magnified image;
   a. a mode conversion lens coupled to the first optical train for receiving the single real magnified image, converting a mode profile of the single real magnified image into a top hat mode profile, and outputting a diverging light beam with a top hat mode profile; and
   b. a second optical train coupled to the mode conversion lens for shaping the light beam into an appropriate spatial geometry in such a manner that the light beam effectively illuminates the entire spatial light modulator, and directing the light beam onto the spatial light modulator.

14. The illumination system according to claim 13 wherein the plurality of light sources is an array of single mode fibers, each single mode fiber providing a laser beam with a gaussian mode profile, further wherein the mode profile of the single real magnified image is also the gaussian mode profile.

15. The illumination system according to claim 14 wherein the first optical train comprises a micro-lens array, one micro-lens for each light source, for collimating the light source outputs, and a first lens coupled to the micro-lens array for magnifying and overlaying each of the collimated light source outputs received from the micro-lens array to form the real magnified image.

16. The illumination system according to claim 15 wherein the first lens is a plurality of lenses.

17. The illumination system according to claim 13 wherein the second optical train comprises a collimating lens for collimating the diverging light beam, and a focusing lens for shaping the light beam into the appropriate spatial geometry and directing the light beam to the spatial light modulator.

18. An illumination system for illuminating a spatial light modulator, comprising:
   a. a plurality of light sources for providing a plurality of light outputs;
   b. first optical means for receiving the light outputs from each light source, magnifying each light output, and overlaying each of the light outputs to form a single real magnified image;
   c. second optical means for receiving the single real magnified image, converting a mode profile of the single real magnified image into a top hat mode profile, and outputting a diverging light beam with a top hat mode profile; and
   d. third optical means for shaping the diverging light beam into an appropriate spatial geometry in such a manner that the light beam effectively illuminates the entire spatial light modulator, and directing the light beam onto the spatial light modulator.

19. The illumination system according to claim 18 wherein the plurality of light sources is an array of single mode fibers, each single mode fiber providing a laser beam with a gaussian mode profile, further wherein the mode profile of the single real magnified image is also the gaussian mode profile.

20. The illumination system according to claim 18 wherein the first optical means comprises a micro-lens array, one micro-lens for each light source, for collimating the light source outputs, and a first lens coupled to the micro-lens array for magnifying and overlaying each of the collimated light source outputs received from the micro-lens array to form the real magnified image.

21. The illumination system according to claim 18 wherein the third optical means comprises a collimating lens for collimating the diverging light beam, and a focusing lens for shaping the light beam into the appropriate spatial geometry and directing the light beam to the spatial light modulator.

22. An illumination system for illuminating a spatial light modulator, comprising:
   a. means for providing a plurality of light outputs;
   b. means for receiving the light outputs from each light source, magnifying each light output, and overlaying each of the light outputs to form a single real magnified image;
   c. means for receiving the single real magnified image, converting a mode profile of the single real magnified image into a top hat mode profile, and outputting a diverging light beam with a top hat mode profile; and
   d. means for shaping the diverging light beam into an appropriate spatial geometry in such a manner that the light beam effectively illuminates the entire spatial light modulator, and directing the light beam onto the spatial light modulator.

* * * * *

UNITED STATES PATENT AND TRADEMARK OFFICE
CERTIFICATE OF CORRECTION

PATENT NO.    : 6,567,584 B2  
DATED         : May 20, 2003  
INVENTOR(S)   : Carlisle et al.

It is certified that error appears in the above-identified patent and that said Letters Patent is hereby corrected as shown below:

<u>Column 9,</u>  
Line 63, replace "pitch A" with -- pitch $\Lambda$ --.

Signed and Sealed this

Twenty-second Day of July, 2003

JAMES E. ROGAN  
*Director of the United States Patent and Trademark Office*